C. F. WAGNER.
HOVER.
APPLICATION FILED MAY 12, 1920.
1,373,037.
Patented Mar. 29, 1921.
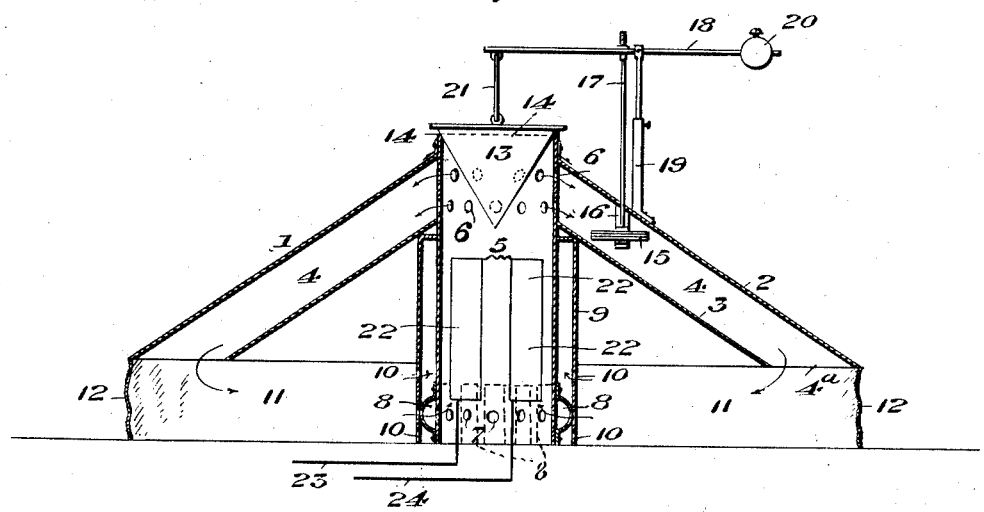
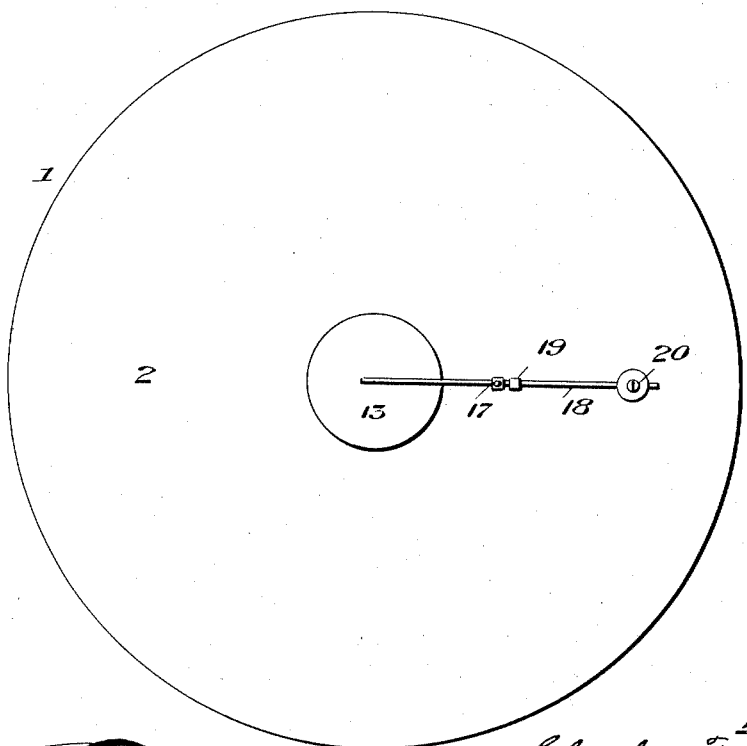

UNITED STATES PATENT OFFICE.

CHARLES F. WAGNER, OF RED BANK, NEW JERSEY.

HOVER.

1,373,037.    Specification of Letters Patent.    Patented Mar. 29, 1921.

Application filed May 12, 1920. Serial No. 380,842.

*To all whom it may concern:*

Be it known that I, CHARLES F. WAGNER, residing at Red Bank, in the county of Monmouth and State of New Jersey, a citizen of the United States, have invented certain new and useful Improvements in Hovers; and I do hereby declare the following to be a full, clear, and exact description of the invention, such as will enable others skilled in the art to which it pertains to make and use the same.

My invention relates to an improvement in hovers for brooding young chicks.

The object of the invention is to provide means for controlling the degree of heat or temperature under all conditions which may arise and produce a perfectly uniform heat or temperature throughout the hover at all times, and at the same time distribute such heat or temperature evenly.

A further object is to provide a hover which is so constructed and arranged that all crowding of the chicks is prevented.

A further object is to provide a hover which is exceedingly simple, inexpensive, economical and durable in construction, easy in operation and in which the loss of chicks is eliminated or at least reduced to a minimum degree.

The invention consists in the several features and in the construction, combination and arrangement of such features as more fully hereinafter described and claimed.

Referring to the drawings:—

Figure 1 is a central vertical section of my invention,

Fig. 2 is a top plan view.

In the drawings in which like reference characters denote like parts throughout the several views, 1 represents my improved hover which is provided with an outer downwardly slanting casing or roof 2, and an inner downwardly slanting casing 3, spaced apart from the outer casing 2 for the purpose of providing or forming an annular downwardly inclined hot air flue or duct 4.

The casings 2 and 3 are supported centrally of and secured by means of bolts or any other means to a vertical heat flue or casing 5 which is provided at its upper portion with two series of openings 6 for the exit of heat which communicate with the annular heat flue or duct 4, and at its lower portion is provided with a series of heat inlet openings 7, each having a shield 8.

Surrounding the vertical heat flue 5, preferably just below the inner casing 3, is a heat receiving cylindrical casing 9 adapted to retain and store heated air for the purpose of keeping the heat flue 5 in a heated condition and 10 are a double series of heat inlet or intake openings in the lower portion of the casing 9. At the lower portion or bottom of the hover a cylindrical chick receiving brooding or hovering chamber 11 is provided which communicates with the hot air flue or duct 4 at its top at point 4ª, and also with the casing 9 through the series of openings 10.

In order to provide a closure for the side of the hover and at the same time afford means whereby the chicks may readily enter and leave the hovering chamber 11, without losing or wasting any more heat than is absolutely necessary, an annular curtain 12 is provided which may be made of any desired material but which I preferably make of some flexible material. The curtain being flexible, after the chicks have pushed it aside, in entering or leaving the hover, it will assume its normal position and keep the heated air from passing out of the hover.

The outlet or exit of any excess of heated air from the heat flue 5, by which the temperature of the air in the hover is regulated, is controlled by means of a conical shaped damper 13 seated in its open upper end 14 and the damper is actuated by means of the thermostat 15 mounted in a bracket 16 depending from the casing 2 and the thermostat is provided with a vertical rod 17 passing through the casing 2 and secured to a lever 18 which in turn is mounted on an adjustable telescopic bracket 19, projecting upwardly from the outside of the casing 2 and the lever 18 is provided with an adjustable counterbalance weight 20 at its outer end and its inner end connected to the damper by means of a link 21. After the excess heated air has passed out of the heat flue 5, the damper will be closed automatically by means of the thermostat and the temperature in the hover will return to the degree desired.

Fresh air is supplied through the curtain 12. Of course the degree of temperature in the hover could also be regulated by regulating the amount of electrical current furnished.

The electrical heating means or unit for the hover comprises resistance coils 22 having positive wire 23, negative wire 24, connected to any suitable source of electrical current or energy not shown.

In operation the chicks that are to be hovered are placed in the hovering chamber 11, the electrical current turned on which energizes the heating coils and the heated air flows upward through the heat flue 5, through the double series of openings 6 into and down the hot air flue or duct 4, into and through the hovering chamber 11, where it warms the chicks, and then passes into the casing 9 through openings 10 around the shields 8 and finally the heated air again returns to the heat flue 5 through the series of apertures 7 and passes upward through the heat flue 5 and is rewarmed and used over again as the operation is repeated, which effects a great saving in the heat required to run the hover.

I do not wish to be understood as limiting myself to the specific details of construction and arrangement as herein described and illustrated, as it is manifest that variations and modifications may be made in the features of construction and arrangement, in the adaption of the device to various conditions of use, without departing from the spirit and scope of my invention and improvements. I therefore reserve the right to all such variations and modifications as properly fall within the scope of my invention and the terms of the following claims.

What I claim is:

1. In a hover, a heat generating casing or flue provided with heat generating means and a downwardly and outwardly directed flue extending from the heat generating casing to substantially the outer wall of the hover chamber for circulating heated air to the outer edge of the hover chamber, said generating chamber having means for returning said heated air to the heat generating chamber for the purpose of reheating it in order that it may be used over again.

2. In a hover, a heat generating casing or flue provided with a series of apertures in its upper and lower portions, heat generating means in said casing, a hover chamber, a downwardly and outwardly directed flue extending from the heat generating casing to substantially the outer wall of the hover chamber for circulating heat to the outer edge of the hover chamber, said flue communicating directly with the apertures in the upper portion of the generating casing or flue and the hover chamber and apertures forming a communication between the hover chamber and the generating casing or flue.

3. In a hover, a heat generating casing or flue provided with a series of apertures in its upper and lower portions and a damper at the top, means for operating said damper, heat generating means in said casing, a heat storage casing surrounding the lower portion of said heat generating casing or flue provided with a series of openings communicating with the hover chamber, a downwardly and outwardly directed flue extending from the heat generating casing to substantially the outer wall of the hover chamber for circulating heat to the outer edge of the hover chamber, said flue communicating with the apertures in the heat generating casing and the hover chamber.

4. In a hover, a heat generating casing or flue provided with a series of apertures in its upper and lower portions and a damper at the top, means for operating said damper, a hover chamber, a heat storing casing surrounding the said heat generating casing or flue, said casing provided with a series of apertures, a downwardly and outwardly directed flue extending from the heat generating casing to substantially the outer wall of the hover chamber for circulating heat to the outer edge of the hover chamber, said flue communicating with the heat generating casing and the hover chamber and means for generating heat.

5. In a hover, a heat generating casing or flue provided with a series of apertures in its upper and lower portions and a damper, means for operating said damper, a hover chamber, a downwardly and outwardly directed flue extending from the heat generating casing to substantially the outer wall of the hover chamber for circulating heat to the outer edge of the hover chamber, said flue communicating with the apertures of the heat generating casing and the hover chamber and means for generating heat.

6. In a hover, a heat generating casing or flue provided with apertures in its upper and lower portions and having a damper at the top, means for operating the damper, a hover chamber, a heat storing chamber surrounding said generating casing or flue and provided with apertures communicating with the hover chamber, a flue communicating with the heat generating casing and the hover chamber and means for generating heat.

In testimony whereof I have affixed my signature.

CHAS. F. WAGNER.